US011433339B2

(12) United States Patent
King et al.

(10) Patent No.: US 11,433,339 B2
(45) Date of Patent: Sep. 6, 2022

(54) ECO-FRIENDLY AIR FILTER ELEMENT HAVING FIXATION SLITS AND REUSABLE EXOSKELETON FRAME

(71) Applicant: MANN+HUMMEL LIFE SCIENCES & ENVIRONMENT HOLDING SINGAPORE PTE. LTD, Singapore (SG)

(72) Inventors: Mark King, North Garden, VA (US); Ronald Walker, Mineral, VA (US); Adam Meagher, Henderson, NV (US); Jon Garth Nichols, Four Oaks, NC (US); Brian Crawford, Fayetteville, NC (US); Nilesh Tharval, Morrisville, NC (US)

(73) Assignee: MANN+HUMMEL Life Sciences & Environment Holding Singapore Pte. Ltd., Singapore (SG)

( * ) Notice: Subject to any disclaimer, the term of this patent is extended or adjusted under 35 U.S.C. 154(b) by 274 days.

(21) Appl. No.: 17/004,656

(22) Filed: Aug. 27, 2020

(65) Prior Publication Data

US 2021/0069622 A1 Mar. 11, 2021

Related U.S. Application Data

(60) Provisional application No. 62/892,233, filed on Aug. 27, 2019.

(51) Int. Cl.
*B01D 46/00* (2022.01)
*B01D 46/10* (2006.01)
*B01D 39/08* (2006.01)

(52) U.S. Cl.
CPC ....... *B01D 46/0005* (2013.01); *B01D 39/083* (2013.01); *B01D 46/0036* (2013.01); *B01D 46/0038* (2013.01); *B01D 46/10* (2013.01); *B01D 2239/045* (2013.01); *B01D 2239/0407* (2013.01); *B01D 2239/0613* (2013.01); *B01D 2239/0672* (2013.01); *B01D 2271/027* (2013.01); *B01D 2275/10* (2013.01); *B01D 2279/50* (2013.01)

(58) Field of Classification Search
CPC ........ B01D 46/00; B01D 46/10; B01D 46/12; B01D 46/0002; B01D 46/0005; B01D 46/523
USPC .... 55/491, 497, 501, 504, DIG. 31, DIG. 35
See application file for complete search history.

(56) References Cited

U.S. PATENT DOCUMENTS 3,184,052 A * 5/1965 Gledhill ................. B65H 75/04
206/226
3,255,810 A * 6/1966 Rowbottam .............. E06B 9/52
160/354

(Continued)

FOREIGN PATENT DOCUMENTS

JP 2001046824 A 2/2001

*Primary Examiner* — Minh Chau T Pham

(57) ABSTRACT

A replaceable air filter element is provided with fixation pockets configured to record corers or edges of reusable exoskeleton support frame. The exoskeleton support frame, The reusable exoskeleton support frame is adapted to detachably engage the fixation pockets to support the filter medium. The exoskeleton support frame of the filter element is configured to be reused such that only the filter medium is replaced, thereby reducing the environmental waste and making for a "green" eco-friendly air filter element.

17 Claims, 4 Drawing Sheets

(56) References Cited

U.S. PATENT DOCUMENTS

| | | | | |
|---|---|---|---|---|
| 3,774,377 A * | 11/1973 | Bishop | ............... | B01D 46/10 55/504 |
| 4,689,058 A * | 8/1987 | Vogt | ............... | B01D 46/10 55/501 |
| 4,737,174 A * | 4/1988 | Pontius | ............... | B01D 53/0407 55/491 |
| 5,145,500 A * | 9/1992 | Nolen, Jr. | ............... | F24C 15/2035 55/501 |
| 5,599,446 A * | 2/1997 | Junker | ............... | B01D 29/96 210/231 |
| 6,361,578 B1 * | 3/2002 | Rubinson | ............... | B01D 46/12 55/DIG. 35 |
| 6,464,745 B2 * | 10/2002 | Rivera | ............... | B01D 46/523 55/497 |
| 6,918,940 B1 * | 7/2005 | Lackey | ............... | B01D 46/10 55/501 |
| 7,118,610 B2 * | 10/2006 | Lipner | ............... | B01D 46/0002 55/497 |
| 7,517,378 B2 * | 4/2009 | Knapp | ............... | B01D 46/0002 55/528 |
| 10,143,953 B1 | 12/2018 | Lee et al. | | |
| 2003/0230061 A1 | 12/2003 | Kubokawa et al. | | |
| 2017/0348624 A1 | 12/2017 | Do | | |

\* cited by examiner

ECO-FRIENDLY AIR FILTER ELEMENT HAVING FIXATION SLITS AND REUSABLE EXOSKELETON FRAME

CROSS-REFERENCE TO RELATED APPLICATION

This application is claims the benefit of U.S. Provisional Application No. 62/892,233 having a US filing date of 27 Aug. 2019. The entire contents of the aforesaid US Provisional application being incorporated herein by reference, to the fullest extent permitted by the law.

TECHNICAL FIELD

The invention relates to the field of air filtration, and in particular, to a replaceable air filter element having fixation pockets and a reusable exoskeleton support frame. The exoskeleton support frame is arranged on an exterior of the filter medium and designed to detachably engage with and support the filter medium. The exoskeleton support frame of the filter element is configured to be reused such that only the filter medium is replaced, thereby reducing the waste and making for a "green" eco-friendly air filter element.

BACKGROUND OF THE INVENTION

Air filters are commonly applied to remove particulates from building air circulation and heating, ventilation and air conditioning (HVAC) systems, for example. Application include air heating, cooling or fresh air circulation systems, for example, in office buildings, factory buildings, commercial retail establishment and residential structures. A HVAC system, as used herein may be a system having at least one or more of the following capabilities: air heating, air cooling, humidity control, and air circulation.

For larger buildings, such as office buildings and retail stores, one or more HVAC systems, due to building size and HVAC system size, may be installed at relatively inaccessible places, such as on the roof of the building.

Often the air from the interior space as well as outdoor air may be laden with undesired or harmful particulates, chemicals, odors, microbes, germs or other contaminants carried in the circulated air. It is highly desirable to remove such pollutants.

To remove particulates and preferably other contaminates, the circulated air may be passed through one of more air filter elements arranged in the air circulation ducts or HVAC system. For larger structures such as factories, office buildings and retail stores, the filter may be arranged at relatively inaccessible locations, such as, for example, on the roof of a building.

Available prior art air filter elements for such HVAC and air circulation systems are generally designed to be installed into the ductwork or a filter receptacle in the HVAC system. The air filter has a finite service life. The air filter is used for a finite period of time until the filter becomes clogged or soiled, and then the filter element is removed and discarded. The filter medium, which is typically a cellulose or woven or non-woven fiber material, on its own is rather flexible and lacks structure rigidity. Therefore to provide a structurally stable filter element, the filter medium is permanently encased in or surround by a support frame. The support frame typically encloses or surrounds the filter medium and is permanently secured to the filter medium. The support frame. In the prior art, the filter element include the frame is discarded with the filter medium whenever a new replacement filter element us installed. The discarded filter element typically ending up in a landfill or waste dump.

Additionally, the prior art air filter elements having the each require addition materials to produce the frame, additional storage space in shipping and handling (due to the space occupied by the frame), and then generate additional waste material when the filter element is removed and replaced at the end of it life.

Prior art filter element, for cost reasons, often have cardboard or cellulose frames. Such frames members can become structurally compromised, losing stiffness, when the frame becomes wet due to humidity or the presence of water. Such frame members can collapse, and the filter element lose structural and shape integrity, preventing the filter element from sealing in the filter receptacle or duct and allowing unfiltered air to bypass the filter element. Additionally, a wet frame can provide a medium for the growth of unhealthy mold and spores and introduce the same into the circulated air flow.

SUMMARY OF THE INVENTION

Accordingly, there is a need for an improved "green", environmentally friendly air filter element that is designed to replace prior art air filter elements in HVAC and air circulation systems, which permits the filter medium to be replaced onto the existing filter frame. Such a configuration reduces waste generated by end of life filter elements and provides a more environmentally friendly air filtration product requiring less material to manufacture and less storage and reduced packaging/shipping space.

According to the invention, the air filter element includes a filter medium panel having one or more filtration layers having porosities selected for particulate removal, the filtration medium panel includes a plurality of receiving or fixation pockets, preferably secured onto or having slits cut into a clean side face or outflow face of the filter medium panel. The filter medium panel includes one or more layers of filter media, the filter media preferably a synthetic polyester material. The filter medium panel may be surround by a seal, to seal the perimeter of the filter element to the housing in which the filter element is to be installed.

The filter medium panel may be treated with EPA approved treatments to control and reduce the growth of microbial within the filter element.

The receiving or fixation pockets are positioned and configured to receive and engage peripheral edge portions of a reusable exoskeleton support frame. The reusable exoskeleton support frame forms a rigid support frame for the filter medium panel.

Preferably one or more support ribs or wire rods are fixed onto the outer ring of the support frame and extend across an interior flow space of the exoskeleton support frame.

At least one of the filtration layers of the filter medium panel may include a gas phase treatment medium having a granular fill configured to trap and remove gas phase contaminates, such as irritating and obnoxious odors, and chemical contaminants. The granular fill may include, for example, granular activated carbon, a carbon and impregnated alumina blend or a blend of zeolite, carbon and impregnated alumina. The granular fill is arranged between two cover sheets, preferably the cover sheets are polyester filter media sheets.

Preferably the granular fill is adhesively bonded to at least of the cover sheets to hold the granular fill in position on the cover sheet and maintain a uniform distribution in the gas phase treatment medium.

To reduce waste, the filter medium panel is supported on an exoskeleton support frame. The exoskeleton support frame is reusable, such that when replacing the air filter element, only the filter medium panel needs to be replaced. The exoskeleton support frame is reused and the new filter medium panel is stretched onto and received into the fixation pockets of the filter medium panel having the one or more stacked filtration layers.

The exoskeleton support frame is preferably formed of substantially rigid metallic wire or rods, preferably galvanized wire. The exoskeleton support frame is received into the fixation pockets of the filter medium panel, thereby supporting and at least partially tensioning the filter medium on the exoskeleton support frame and holding the filter medium sheet on the exoskeleton support frame. The exoskeleton support frame acts to hold the shape of the filter medium panel in a desired shape or form to be received into and preferably seal at its periphery against a filter receptacle in an air duct or HVAC system.

The exoskeleton support frame may have one or more support ribs or rods, preferably of galvanized wire, arranged to support the filter medium against forces created by airflow through the filter medium. As such, the one or more support ribs or rods are preferably arranged at the clean side or outlet flow side of the filter medium.

Preferably the material of the exoskeleton support frame is rigid and impervious to moisture and is preferably one piece. Preferably the support frame with the one or more support ribs or rods is of a welded rigid one-piece construction.

In various aspects of the invention, replacement of the filter element is accomplished by replacement of the used filter medium panel with a new filter medium panel installed onto the reusable exoskeleton support frame. The exoskeleton support frame is configured and adapted for reuse, thereby reducing environmental waste and reducing filter element replacement cost.

An air filter element according to the present inventive disclosure includes a replaceable filter medium panel having one or more sheets of filter media forming one or more air filtration ply layers At least some of the sheets of filter media may be formed of or include a synthetic woven fabric material with a pore size selected for particle filtration. The filter medium panel an inflow face where air to be filtered enters the filter medium panel; and an outflow face where filtered air exits the filter medium panel. A plurality of fixation pockets arranged on the outflow face at peripheral edges or peripheral edge corners of the filter medium panel. The plurality of fixation pockets open radially inwardly towards a central portion of the outflow face of the filter medium panel.

The filter medium panel is detachably installable on to an exoskeleton support frame having a circumferentially closed frame forming an outer boundary of the exoskeleton support frame. The circumferentially closed frame surrounds an inner flow space opening of the exoskeleton support frame, the circumferentially closed frame sized to have peripheral edges or peripheral edge corners of the circumferentially closed frame received into and engage into the plurality of fixation pockets, so as to stretch or tension and mount the outflow face of the filter medium panel onto the exoskeleton support frame.

The exoskeleton support frame is removable from the fixation pockets of the filter medium panel, such that the filter medium panel can be removed and replaced with a new filter medium panel on the same exoskeleton support frame, thereby minimizing waste and reducing filter replacement cost in renewing the filter element and returning to service.

In some aspects of the invention, one or more support ribs or support rods are provided which extend across the circumferentially closed frame, across the inner flow space opening of the exoskeleton support frame. Opposing ends of the one or more support ribs or support rods fixedly secured onto the exoskeleton support frame, preferably welded to the circumferentially closed outer ring. Preferably, the one or more support ribs or support rods are spaced apart across inner flow space opening of the exoskeleton support frame. The one or more support ribs or support rods extend across the outflow face of the filter medium panel, supporting the filter medium panel against flow forces induced by air flow through the filter medium panel.

In some aspects of the invention, the exoskeleton frame is formed of metallic wire or rod material forming a structurally rigid exoskeleton support frame. Preferably the metallic wire or rod material of the exoskeleton frame is galvanized steel, chromed steel or aluminum.

In some aspects of the invention, the one or more support ribs or support rods intersect in the inner flow space opening of the exoskeleton support frame, forming a support grid against which the filter medium rests.

In some aspects of the invention, the one or more air filtration ply layers of the filter medium panel include at least one gas phase treatment medium ply layer having a granular fill configured to trap and remove gas phase contaminates, chemical contaminants and irritating and obnoxious odors. The at least one gas phase treatment medium ply layer includes at least one cover sheet. The granular fill is preferably adhesively bonded to the at least one cover sheet to fix the granular fill in position on the at least one cover sheet and to maintain a uniform distribution in the gas phase treatment medium on the cover sheet.

In some aspects of the invention, the granular fill is selected from the set consisting of: granular activated carbon, a carbon and impregnated alumina blend or a blend of zeolite, carbon and impregnated alumina.

In some aspects of the invention, the synthetic woven fabric material of the filter media comprises a synthetic polyester material.

Preferably, in various aspects of the invention, a radially outer portion of the filter medium panel is resilient and compressible and configured to form a seal between the filter medium panel and a housing configured to receiving the filter medium panel.

Preferably, in in at least some aspects of the invention, the filter medium panel may have a filtration efficiency rating from MERV 6 to MERV 9.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

Figure 1:
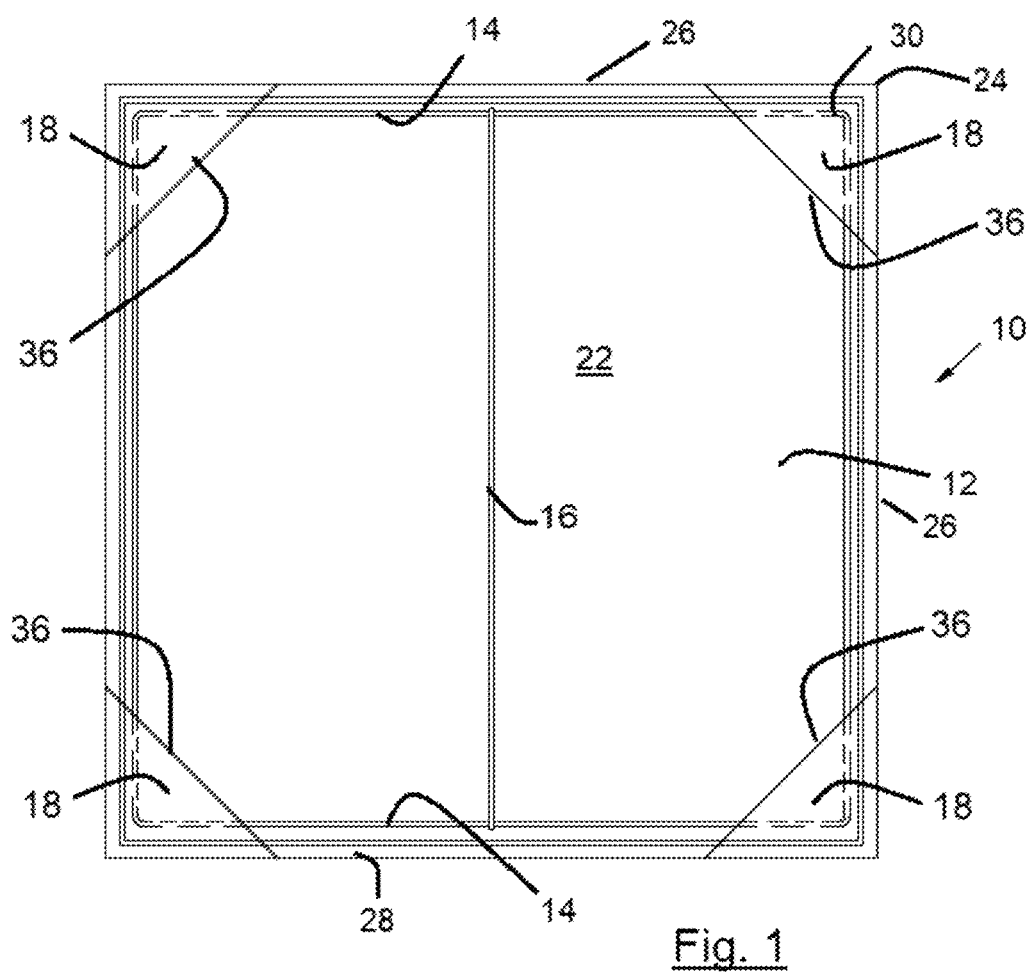
FIG. 1 depicts an outflow face side of an air filter element having a filter medium panel with fixation pockets fixed onto the outflow face and a ring frame exoskeleton support frame engaged in the fixation pockets, consistent with the present inventive disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of apparatus components related to a filter apparatus. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Figure 1A:
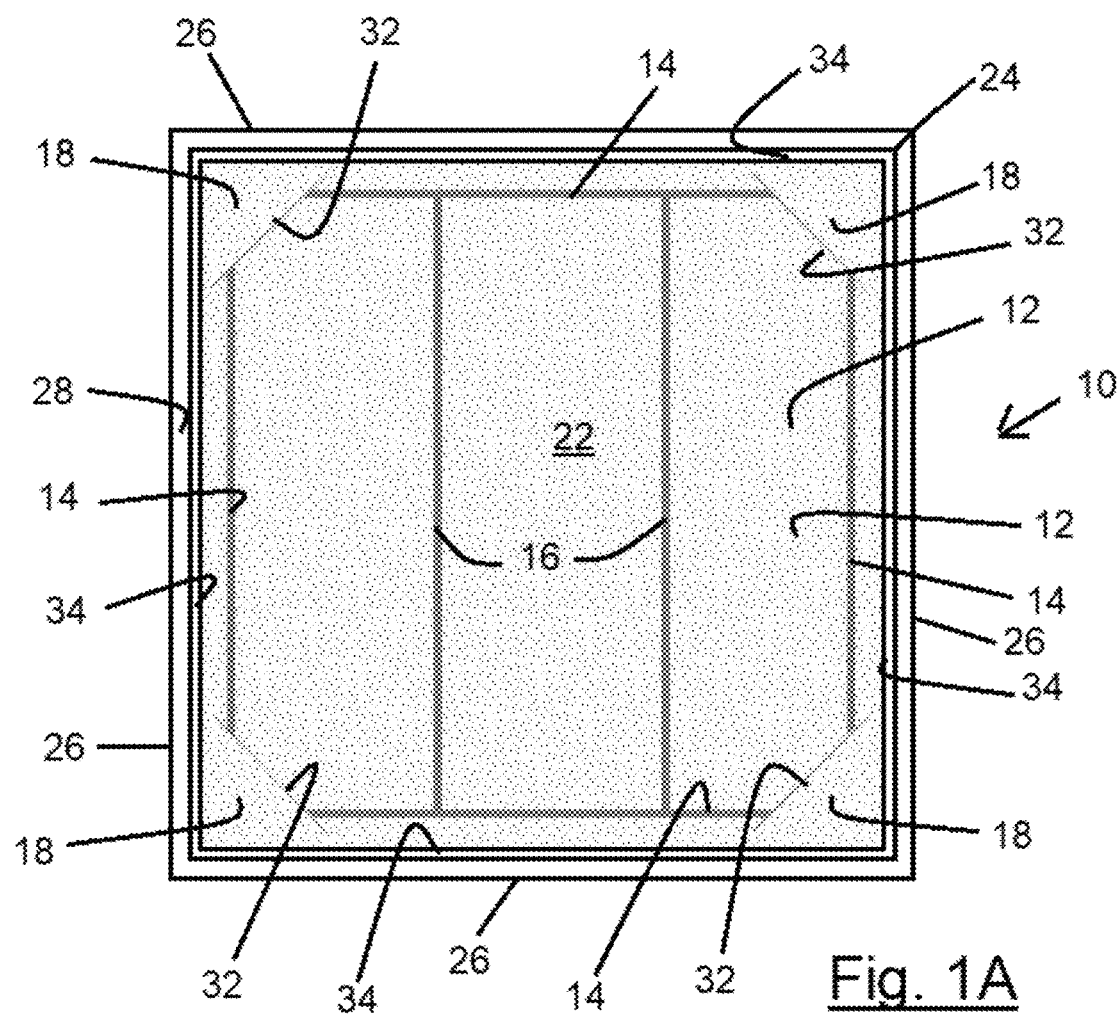
FIG. 1A depicts an outflow face side of an air filter element having a filter medium panel with fixation pockets formed as pocket slits cut into the outflow face of the filter medium panel, consistent with the present inventive disclosure.
Figure 2:
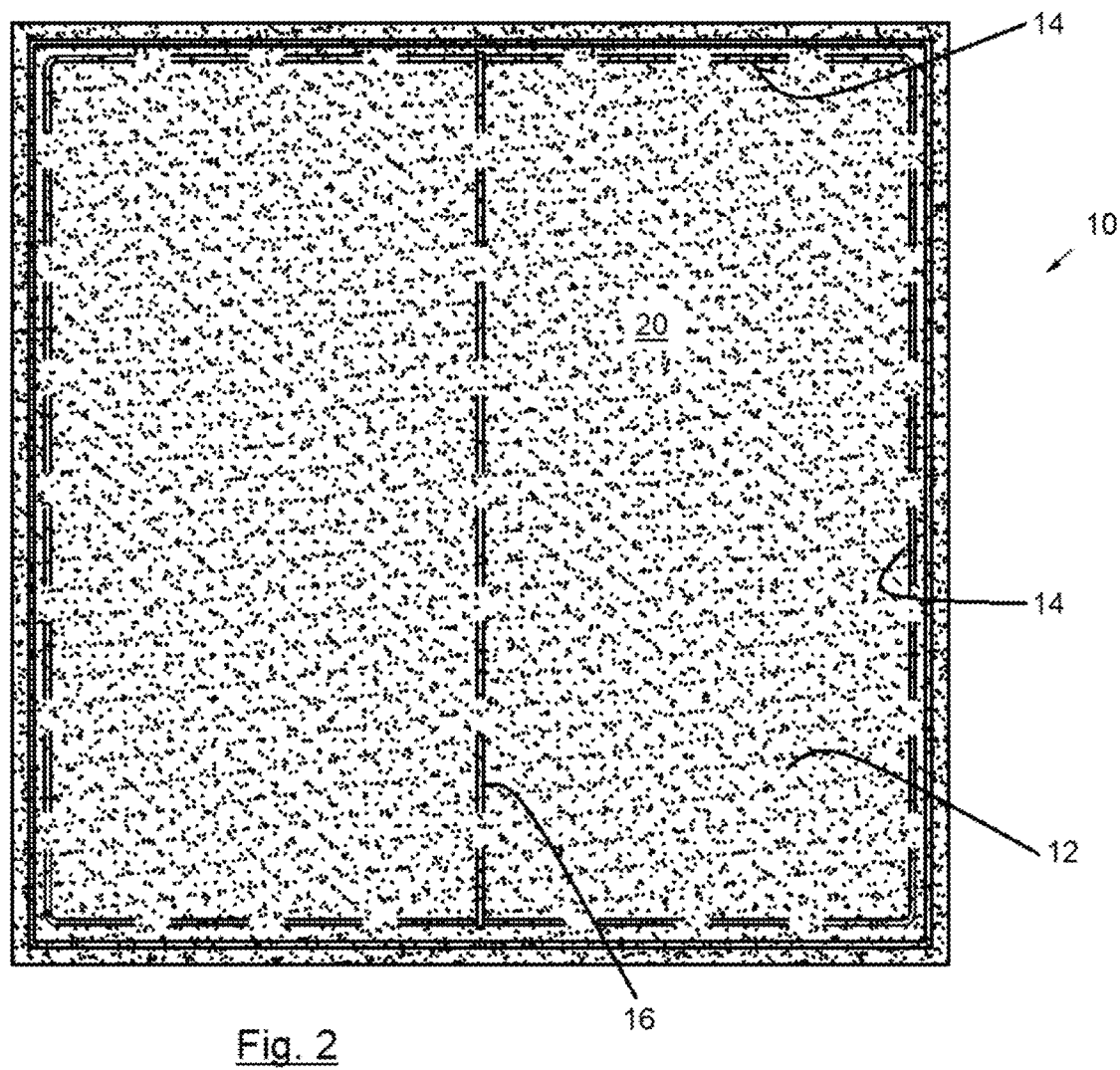
FIG. 2 depicts an inflow face side of the air filter element of, consistent with the present inventive disclosure.

FIGS. 1 and 1A depict an outflow face side of an air filter element 10 having a filter medium panel 12 and an exoskeleton support frame 14. FIG. 2 depicts an inflow face side of the air filter element 10 of FIG. 1 having a filter medium panel 12. The exoskeleton support frame 14, which has an outer circumference that is ring-shaped, is shown in dashed lines (hidden lines) in FIG. 1.

The air filter element 10 includes a replaceable filter medium panel 12 having one or more plies of filter media sheets, plies or layers having porosities selected for particulate removal. The filter media includes preferably of a synthetic woven fabric. In the specific example illustrated embodiment, four fixation pockets 18 are fixed onto the outflow face 22 or are formed pocket slits 32 cut into the outflow face 22, the fixation pockets and opening in a direction towards a central portion of the outflow face 22. In the embodiment of FIG. 1, the fixation pockets 18 are arranged adjacent to corners 24 formed by the peripheral outer edges 26 of the filter medium panel 12. Only one corner 24 is labeled. The fixation pockets 18 may be formed on the outflow face 22 by the addition of reinforced pocket-shaped woven or non-woven members 18 onto the outflow face 22, fixed onto or secured to the outflow face 22 of the filter medium panel 12 by a suitable means, including for example: a sewn connection, or by an adhesive, or preferably by radio frequency or laser welding the reinforced pocket-shaped woven or non-woven members 18 directly onto the outflow face 22 of the replaceable filter medium panel 12.

When the replaceable filter medium panel 12 has two or more air filtration ply layers, the air filtration ply layers are preferably secured together, face to face, by radio frequency or laser welding along a weld line 40 arranged proximate to or adjacent to peripheral outer edges 26 the air filtration ply layers.

When the fixation pockets are formed by reinforced pocket-shaped woven or non-woven members arranged on the outflow face, the radio frequency or laser welding may extend though outer edges of the reinforced pocket-shaped woven or non-woven members 18 of the fixation pockets, thereby fixing and mounting the fixation pockets directly onto the outflow face 22.

As shown in FIG. 1A, the fixation pockets 18 may be formed as pocket slits 32 cut into the outflow face 22 of the outflow layer, the pocket slits 22 are preferably arranged inwardly from and adjacent to peripheral outer edges 26 or peripheral edge corners 30 of the air filter medium panel 12. The pocket slit of each of the plurality of fixation pockets open radially inwardly towards a central portion of the outflow face 22 to receive peripheral edges or peripheral edge corners of the exoskeleton support frame 14 into the pocket slit 32 and into an interior of the outflow layer.

The receiving or fixation pockets 18 are positioned and configured to receive and engage peripheral edge portions of a reusable exoskeleton support frame 14. The reusable exoskeleton support frame 14 forms a rigid outer exoskeleton support frame 14 for the filter medium panel 12, on the outflow face 22.

The filter medium panel 12 may be provided with and surround by a compressible seal 28, to seal the outer circumference of the of the filter medium panel 12 to a filter receptacle (not shown) of an air duct or HVAC system in which the filter element is to be installed.

Corner portions 30 of the reusable exoskeleton support frame 14 are received and engaged into the fixation pockets 18, stretching or tensioning the filter medium panel 12 on the exoskeleton support frame 14. The reusable exoskeleton support frame 14 forms a rigid outer exoskeleton support frame for the filter medium panel 12.

The reusable exoskeleton support frame is substantially structurally rigid and forms a rigid outer exoskeleton support frame for the filter medium panel 12.

The filtration layers of the filter medium panel 12 may include a gas phase treatment medium having a granular fill configured to trap and remove gas phase contaminates, such as irritating and obnoxious odors, and chemical contaminants, as discussed earlier.

To reduce waste, the filter medium panel 12 is supported on a reusable exoskeleton support frame 14, such that when replacing the air filter medium panel 12 of the air filter element 10, only the filter medium panel 12 needs to be replaced. The exoskeleton support frame 14 is reused and the new filter medium panel 12 is stretched onto and received into the corner pockets of the filter medium sheet having the one or more stacked filtration layers.

The exoskeleton support frame 14 is preferably formed of substantially rigid metallic wire or rods, preferably galvanized wire. The exoskeleton support frame 14 is received into the fixation pockets 18 of the filter medium panel 12, thereby stretching and tensioning the filter medium panel 12 on the exoskeleton support frame 14 and holding the filter medium panel on the exoskeleton support frame 14. The exoskeleton support frame 14 acts to hold the shape of the filter medium panel 12 in a desired shape to be received into and seal into a filter receptacle in an air duct or HVAC system.

Preferably one or more support ribs or wire rods 16 are fixed onto the circumferentially closed frame forming the outer boundary of the exoskeleton support frame 14 and extends across the interior flow space of the exoskeleton support frame 14.

Figure 3:
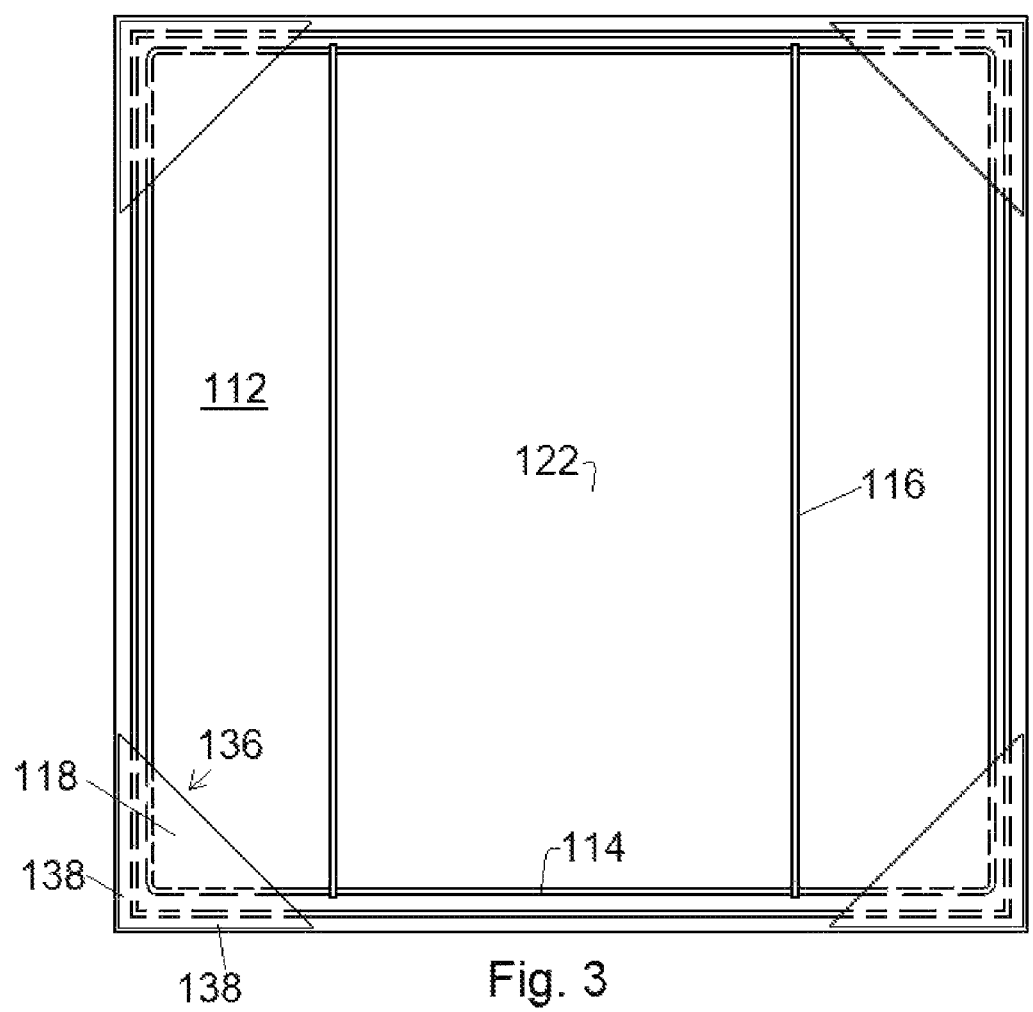
FIG. 3 depicts a simplified example of the filter medium panel having a an example filter media with pockets and a ring frame exoskeleton support frame engaged in the pockets, further illustrating the fixation pockets concept and consistent with the present inventive disclosure.

As a concept example for understanding, FIG. 3. depicts a highly simplified concept illustration (for demonstration of the exoskeleton support frame 114 engaging the fixation pockets 118 to tension an example simple filter medium panel 112, consistent with the present inventive disclosure.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. An air filter element comprising:
    a filter medium panel comprising:
        one or more sheets of filter media forming one or more air filtration ply layers;
        wherein, when the one or more air filtration ply layers are at least two air filtration ply layers, the at least two air filtration ply layers are overlaid and stacked upon each other face to face to form a multilayer filter medium panel;
        wherein at least some of the air filtration ply layers comprise a synthetic woven fabric material;
        wherein the filter medium panel has
            an inflow face where air to be filtered enters the filter medium panel; and
            an outflow face where filtered air exits the filter medium panel;
            a plurality of fixation slits are cut into an outflow face of the outflow layer, the fixation slits are inwardly from and adjacent to peripheral edges or peripheral edge corners of the filter medium panel, the slit of each of the plurality of fixation slits are arranged on the outflow face of the filter medium panel, the plurality of fixation slits arranged adjacent to peripheral edges or peripheral edge corners of the filter medium panel, the plurality of fixation slits positioned to open opening radially inwardly towards a central portion of the outflow face;
    an exoskeleton support frame which is ring-shaped and comprising:
        a circumferentially closed frame forming an outer boundary of the exoskeleton support frame which surrounds an inner flow space opening of the exoskeleton support frame, the circumferentially closed frame sized to have peripheral edges or peripheral edge corners of the circumferentially closed frame received into and engage into respective ones of the plurality of fixation slits, so as to retain, support, and mount the outflow face of the filter medium panel onto the exoskeleton support frame,
        wherein the exoskeleton support frame is removable from the fixation pockets of the filter medium panel, such that the filter medium panel can be removed and replaced with a new filter medium panel on the exoskeleton support frame, thereby reusing the exoskeleton frame and thereby minimizing waste.

2. The air filter element according to claim 1, wherein the one or more air filtration ply layers are at least two air filtration ply layers, having an outflow layer forming the outflow face of the filter medium panel.

3. The air filter element according to claim 2, wherein the at least two air filtration ply layers are secured together, face to face, by radio frequency or laser welding along a weld line proximate to or adjacent to outer edges of at least two air filtration ply layers.

4. The air filter element according to claim 1, wherein the at least two air filtration ply layers are secured together, face to face, by radio frequency or laser welding along a weld line proximate to or adjacent to outer edges of the at least two air filtration ply layers.

5. The air filter element according to claim 1, wherein the exoskeleton frame includes:
    one or more support ribs or support rods extending across the circumferentially closed frame across the inner flow space opening of the exoskeleton support frame, opposing ends of the one or more support ribs or support rods fixedly secured onto the exoskeleton support frame, wherein the one or more support ribs or support rods are spaced apart across inner flow space opening of the exoskeleton support frame;
    wherein the one or more support ribs or support rods extend across the inner flow space of the outflow face of the filter medium panel, supporting the filter medium panel against flow forces induced by air flow through the filter medium panel.

6. The air filter element according to claim 5, wherein the exoskeleton frame is formed of metallic wire or rod material forming a structurally rigid exoskeleton support frame.

7. The air filter element according to claim 6, wherein the metallic wire or rod material of the exoskeleton frame is galvanized steel, chromed steel or aluminum.

8. The air filter element according to claim 5, wherein the one or more support ribs or support rods intersect in the inner flow space opening of the exoskeleton support frame, forming a support grid.

9. The air filter element according to claim 1, wherein the one or more air filtration ply layers of the filter medium panel include at least one gas phase treatment medium ply layer having a granular fill configured to trap and remove gas phase contaminates, chemical contaminants and irritating and obnoxious odors the at least one gas phase treatment medium ply layer having at least one cover sheet;

wherein the granular fill is adhesively bonded to the at least one cover sheet to fix the granular fill in position on the at least one cover sheet and maintain a uniform distribution in the gas phase treatment medium.

10. The air filter element according to claim 9, wherein the granular fill is selected from the set consisting of: granular activated carbon, a carbon and impregnated alumina blend or a blend of zeolite, carbon and impregnated alumina.

11. The air filter element according to claim 1, wherein the synthetic woven fabric material of the filter media comprises a synthetic polyester material.

12. The air filter element according to claim 1, wherein a radially outer portion of the filter medium panel is resilient and compressible and configured to form a seal between the filter medium panel and a housing configured to receiving the filter medium panel.

13. The air filter element according to claim 1, wherein the filter medium panel has a filtration efficiency rating from MERV 6 to MERV 9.

14. The air filter element according to claim 1, wherein the one or more air filtration ply layers are at least two air filtration ply layers;

wherein the at least two air filtration ply layer are secured together face to face by any of: a sewn connection, an adhesive, radio frequency welding or laser welding.

15. A filter medium panel comprising:

a plurality of sheets of filter media forming at least two air filtration ply layers;

wherein the at least two air filtration ply layers are overlaid and stacked upon each other face to face to form the multilayer filter medium panel;

wherein at least some of the air filtration ply layers comprise a synthetic woven fabric material;

wherein the filter medium panel has
  an inflow face where air to be filtered enters the filter medium panel; and
  an outflow face where filtered air exits the filter medium panel;
  a plurality of fixation slits cut into an outflow air filtration ply layer of the one or more air filtration ply layers, on the outflow face of the filter medium panel, the plurality of fixation slits arranged adjacent to peripheral edges or peripheral edge corners of the filter medium panel, the plurality of fixation slits opening radially inwardly towards a central portion of the outflow face;

wherein the plurality of fixation slits are configured to receive peripheral edges or peripheral edge corners of an exoskeleton support frame, to retain, support, and mount the outflow face of the filter medium panel onto the exoskeleton support frame;

wherein the exoskeleton support frame is removable from the fixation pockets of the filter medium panel, such that the filter medium panel can be removed and replaced on the exoskeleton support frame.

16. The filter medium panel according to claim 15, wherein
the at least two air filtration ply layers are secured together, face to face by any of: a sewn connection, an adhesive, radio frequency welding or laser welding,
wherein the radio frequency or laser welding is applied along a weld line proximate to or adjacent to outer edges of the at least two air filtration ply layers.

17. The filter medium panel according to claim 15, wherein
the at least two air filtration ply layers are secured together, face to face, by radio frequency or laser welding along a weld line proximate to or adjacent to outer edges of at least two air filtration ply layers;
wherein the weld line extends along outer edges of the plurality of fixation pockets, fixing the plurality of reinforced pocket-shaped woven or non-woven members directly to the outflow face.

* * * * *